(12) United States Patent
Foley et al.

(10) Patent No.: US 10,814,551 B2
(45) Date of Patent: Oct. 27, 2020

(54) THREE-DIMENSIONAL PRINTED PART REMOVAL USING AN ELASTOMER SHEET

(71) Applicant: Xerox Corporation, Norwalk, CT (US)

(72) Inventors: Timothy P. Foley, Marion, NY (US); Robert B. Anderson, Jr., Syracuse, NY (US); Eliud Robles Flores, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 458 days.

(21) Appl. No.: 14/677,353

(22) Filed: Apr. 2, 2015

(65) Prior Publication Data

US 2016/0288427 A1 Oct. 6, 2016

(51) Int. Cl.
| | |
|---|---|
| B29C 64/112 | (2017.01) |
| B29C 64/20 | (2017.01) |
| B33Y 50/02 | (2015.01) |
| B33Y 40/00 | (2020.01) |
| B33Y 30/00 | (2015.01) |
| B33Y 10/00 | (2015.01) |

(52) U.S. Cl.
CPC .......... *B29C 64/20* (2017.08); *B29C 64/112* (2017.08); *B33Y 10/00* (2014.12); *B33Y 30/00* (2014.12); *B33Y 40/00* (2014.12); *B33Y 50/02* (2014.12)

(58) Field of Classification Search
CPC ......... B33Y 10/00–99/00; B33Y 30/00; B29C 67/0051–0099; B29C 60/40; B29C 64/20; B29C 64/245
See application file for complete search history.

(56) References Cited

U.S. PATENT DOCUMENTS

| | | | |
|---|---|---|---|
| 4,052,217 A | 10/1977 | Watkinson | |
| 5,094,095 A | 3/1992 | Barrois et al. | |
| 5,141,680 A | 8/1992 | Almquist et al. | |
| 5,171,490 A * | 12/1992 | Fudim | B29C 67/007 |
| | | | 264/308 |
| 6,269,938 B1 | 8/2001 | Lutz | |
| 6,571,702 B2 * | 6/2003 | Wotton | B41J 11/002 |
| | | | 101/232 |
| 8,911,199 B2 | 12/2014 | Herrmann et al. | |
| 2007/0063389 A1 * | 3/2007 | John | B29C 33/68 |
| | | | 264/401 |
| 2011/0241947 A1 * | 10/2011 | Scott | B29C 64/245 |
| | | | 343/700 MS |
| 2012/0286453 A1 * | 11/2012 | Pettis | B29C 67/0051 |
| | | | 264/401 |

(Continued)

*Primary Examiner* — Matthew J Daniels
*Assistant Examiner* — Andrew D Graham
(74) *Attorney, Agent, or Firm* — Maginot Moore & Beck LLP

(57) ABSTRACT

A three-dimensional object printer automatically removes parts formed on a platen in the printer. The printer includes a platen having a surface and a planar member disposed upon the surface of the platen. The printer further includes an actuator configured to deform the planar member and an ejector head having at least one ejector configured to eject material onto the planar member. The printer further includes a controller operatively connected to the actuator and the ejector head. The controller is configured to operate the ejector head to eject material onto the planar member to form a three-dimensional object, and to operate the actuator to deform the planar member and release the three-dimensional object from the planar member.

4 Claims, 8 Drawing Sheets

(56) References Cited

U.S. PATENT DOCUMENTS

| | | | |
|---|---|---|---|
| 2013/0241117 A1* | 9/2013 | Lind | B29C 70/443 |
| | | | 264/511 |
| 2014/0220168 A1* | 8/2014 | Perez | B29C 64/245 |
| | | | 425/161 |
| 2014/0265032 A1 | 9/2014 | Teicher et al. | |
| 2014/0361463 A1* | 12/2014 | DeSimone | B29C 67/0062 |
| | | | 264/401 |
| 2015/0192919 A1* | 7/2015 | Sketch | G05B 19/182 |
| | | | 700/118 |
| 2015/0224710 A1* | 8/2015 | El-Siblani | B33Y 70/00 |
| | | | 264/401 |
| 2016/0016361 A1* | 1/2016 | Lobovsky | B33Y 30/00 |
| | | | 264/308 |
| 2016/0075091 A1* | 3/2016 | Cable | B29C 64/20 |
| | | | 528/272 |
| 2016/0361868 A1* | 12/2016 | Wang | B33Y 30/00 |

* cited by examiner

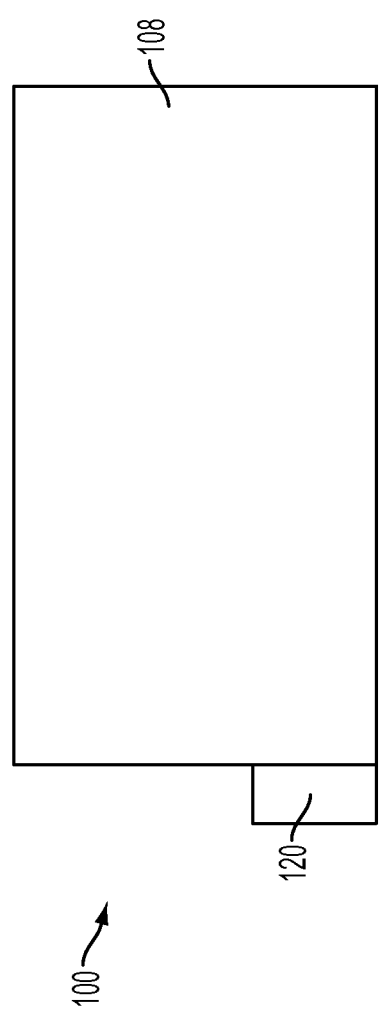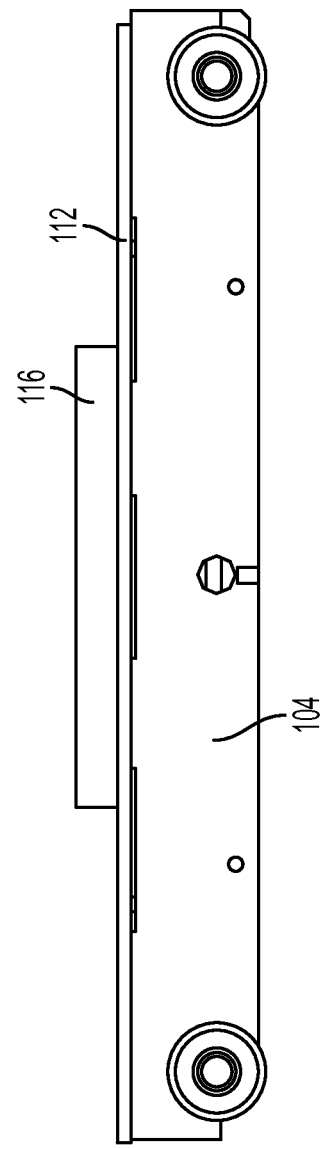
FIG. 1

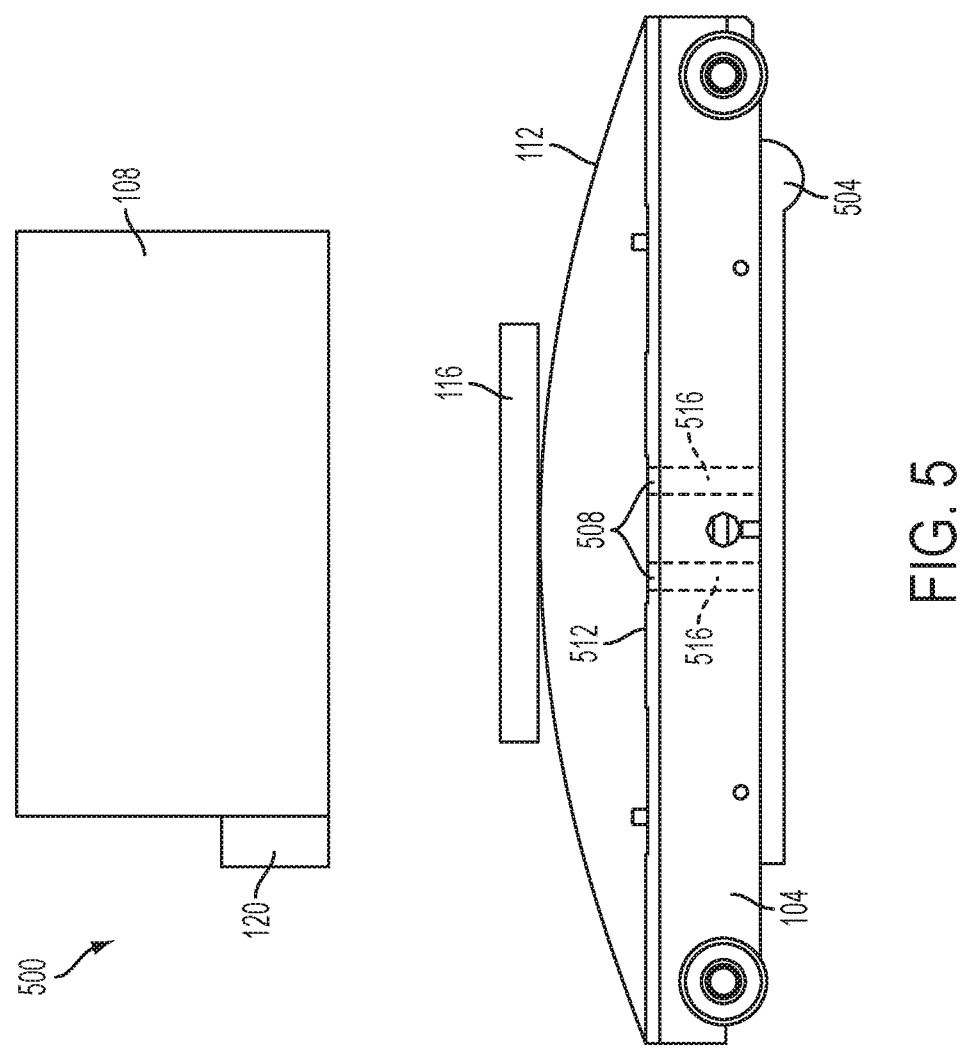

THREE-DIMENSIONAL PRINTED PART REMOVAL USING AN ELASTOMER SHEET

TECHNICAL FIELD

The device and method disclosed in this document relates to three-dimensional object printing and, more particularly, to removal of a three-dimensional object from a platen on which the object was formed.

BACKGROUND

Digital three-dimensional object manufacturing, also known as digital additive manufacturing, is a process of making a three-dimensional solid object of virtually any shape from a digital model. Three-dimensional object printing is an additive process in which one or more ejector heads eject successive layers of material on a substrate in different shapes. The substrate is supported either on a platform that can be moved three dimensionally by operation of actuators operatively connected to the platform, or the ejector heads are operatively connected to one or more actuators for controlled movement of the ejector heads to produce the layers that form the object. Three-dimensional object printing is distinguishable from traditional object-forming techniques, which mostly rely on the removal of material from a work piece by a subtractive process, such as cutting or drilling.

Manufacturing of three-dimensional printed parts at high speed is a significant challenge because many of the processes involved are time consuming and often done manually. Automation has provided for higher speed and more efficient processing of three-dimensional printed parts. One area of concern relates to removal of the three-dimensional printed part from the build platen. Often the three-dimensional printed part sticks to the build platen and can be challenging to remove. Current methods for part removal include heating, impacting, scraping, and freezing. These methods are generally cumbersome, time consuming, and risk damaging the part or the build platen. What is needed is a method for removing a three-dimensional printed part from a build platen that is fast, reliable, and easily automated.

SUMMARY

A three-dimensional object printer includes a platen having a surface, a planar member disposed upon the surface of the platen, an actuator configured to deform the planar member, an ejector head having a plurality of ejectors configured to eject drops of material towards the planar member, and a controller operatively connected to the actuator and the ejector head, the controller being configured to: operate the plurality of ejectors in the ejector head to eject the drops of material towards the platen and form layers of material with reference to digital image data of a three-dimensional object to produce the three-dimensional object on the planar member, and operate the actuator to deform the planar member and release the three-dimensional object from the planar member.

A method of removing a three-dimensional object formed on a platen of a printer includes operating ejectors with a controller with reference to digital image data of a three-dimensional object to eject drops of material towards a planar member covering a surface of a platen and form a plurality of layers that produces the three-dimensional object on the planar member, and operating an actuator to deform the planar member to release the three-dimensional object from the planar member.

BRIEF DESCRIPTION OF THE DRAWINGS

The foregoing aspects and other features of the printer and method are explained in the following description, taken in connection with the accompanying drawings.

FIG. 1 shows a three-dimensional object printer.

FIG. 5 shows an embodiment of the printer of FIG. 1 having an air pump configured to inflate a planar member.

DETAILED DESCRIPTION

Figure 2:
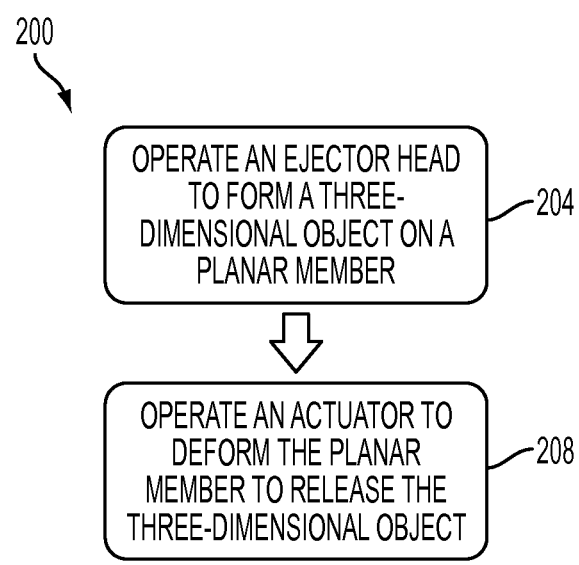
FIG. 2 shows a method for releasing a printed part from a platen.

For a general understanding of the environment for the printer and method disclosed herein as well as the details for the printer and method, reference is made to the drawings. In the drawings, like reference numerals designate like elements.

FIG. 1 shows a three-dimensional object printer 100. The printer 100 comprises a platen 104 and an ejector head 108. A planar member 112 is disposed upon a surface of the platen 104. In some embodiments, the planar member 112 is made of an elastic material. Particularly, in one embodiment, the planar member 112 comprises an elastomer sheet. The ejector head 108 has a plurality of ejectors configured to eject material onto the planar member 112 to form a three-dimensional object, such as the part 116. In some embodiments, the ejector head 108 is further configured to eject a wax base prior to forming the part 116. The printer 100 includes an at least one actuator configured to deform the planar member 112. The printer 100 further includes a controller 120 operably connected to the ejector head 108 and the actuator and the controller is configured to operate the ejector head 108 and the actuator.

A method 200 for operating the printer 100 to automatically release printed parts from the platen 104 is shown in FIG. 2. In the description of the method, statements that the method is performing some task or function refers to a controller or general purpose processor executing programmed instructions stored in non-transitory computer readable storage media operatively connected to the controller or processor to manipulate data or to operate one or more components in the printer to perform the task or function. The controller 120 noted above can be such a controller or processor. Alternatively, the controller can be implemented with more than one processor and associated circuitry and components, each of which is configured to form one or more tasks or functions described herein.

When the method 200 is performed, it begins by operating an ejector head to form a three-dimensional object on a planar member (block 204). The controller 120 operates the ejector head 108 to eject material onto the planar member 112 to form the part 116. Next, the method 200 operates an actuator to deform the planar member to release the three-dimensional object (block 208). The controller 120 operates the actuator to deform the planar member 112. By deforming the planar member 112 any adhesion between the part 116 and the planar member 112 is broken, thereby releasing the part 116. In some embodiments, the method 200 operates the actuator to deform the planar member prior to forming the three-dimensional object on the planar member.

Figure 3:
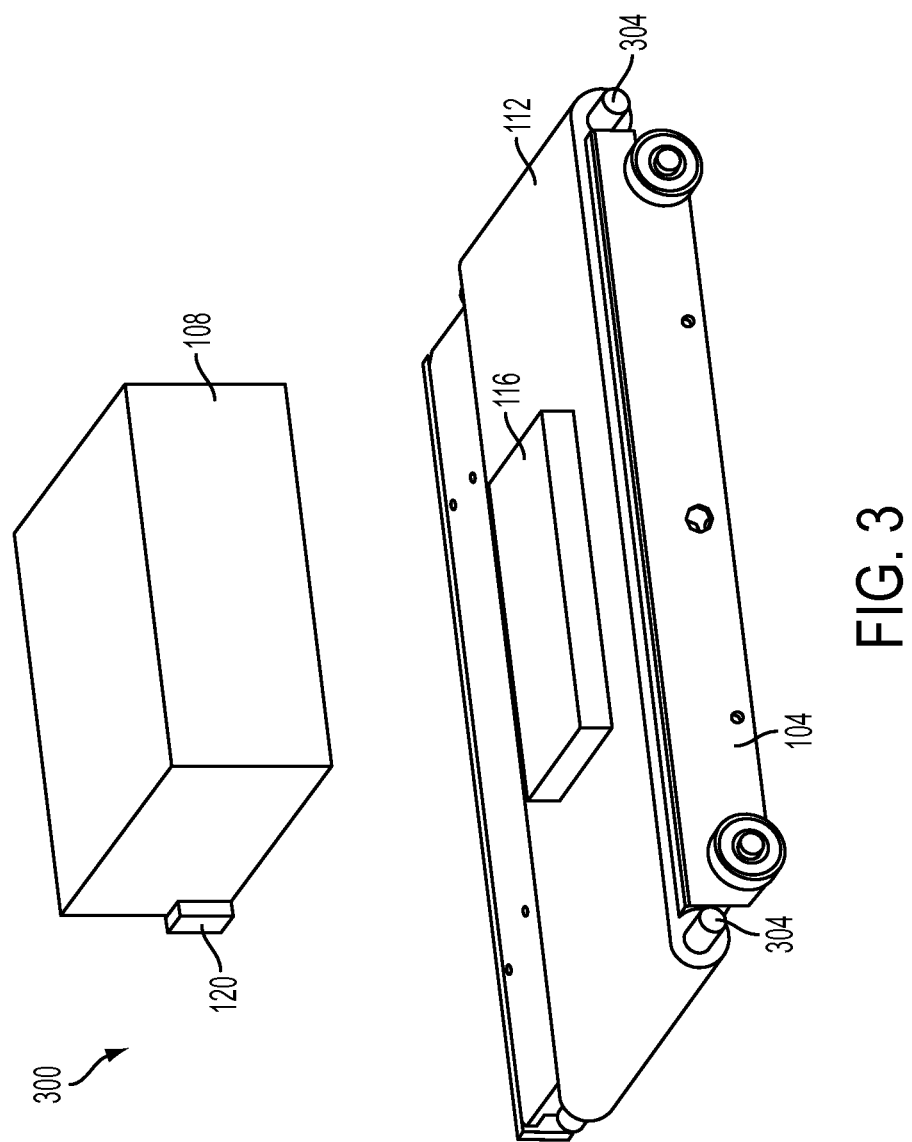
FIG. 3 shows an embodiment of the printer of FIG. 1 having rollers configured to stretch a planar member.

FIG. 3 shows a printer 300, which is one embodiment of the printer 100, wherein the actuator comprises at least one roller configured to deform the planar member 112 by stretching it horizontally. As used herein, "horizontally" refers to a direction that is parallel with the planar surface of the planar member 112. A pair of rollers 304 is disposed at opposite ends of the platen 104. The planar member 112 is attached at opposite ends to the pair of rollers 304. The controller 120 is configured to operate the rollers 304 to stretch the planar member 112 horizontally along the surface of the platen. Stretching the planar member 112 causes localized shear forces to break any adhesion between the part 116 and the planar member 112. In this way, the printer 100 releases the part 116 from platen 104 in an automated way that does not risk damaging the part. This particular embodiment of the printer 100 is operated using one of the methods 400, 404, and 408, shown in FIGS. 4a, 4b, and 4c, respectively.

Figure 4A:
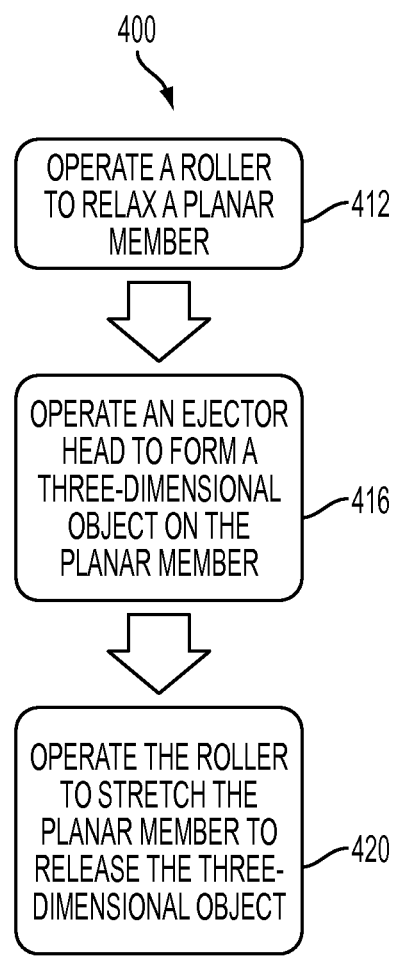
FIGS. 4a, 4b, and 4c show embodiments of the method of FIG. 2 for operating the printer of FIG. 3.

A method 400 for operating the printer 100 to automatically release printed parts from the platen 104 is shown in FIG. 4a. The method 400 is an embodiment of the method 200. When the method 400 is performed, it begins by operating a roller to relax a planar member (block 412). The controller 120 operates at least one of the rollers 304 to relax the planar member 112. As used herein, "relax" refers to returning the planar member 112 to an un-deformed state. Next, the method 400 operates an ejector head to form a three-dimensional object on the planar member (block 416). The controller 120 operates the ejector head 108 to eject material onto the planar member 112 to form the part 116. Next, the method 400 operates the roller to stretch the planar member to release the three-dimensional object (block 420). The controller 120 operates at least one of the rollers 304 to horizontally stretch the planar member 112. The stretching of the planar member breaks any adhesion between the part 116 and the planar member 112 to release the part 116.

Figure 4B:
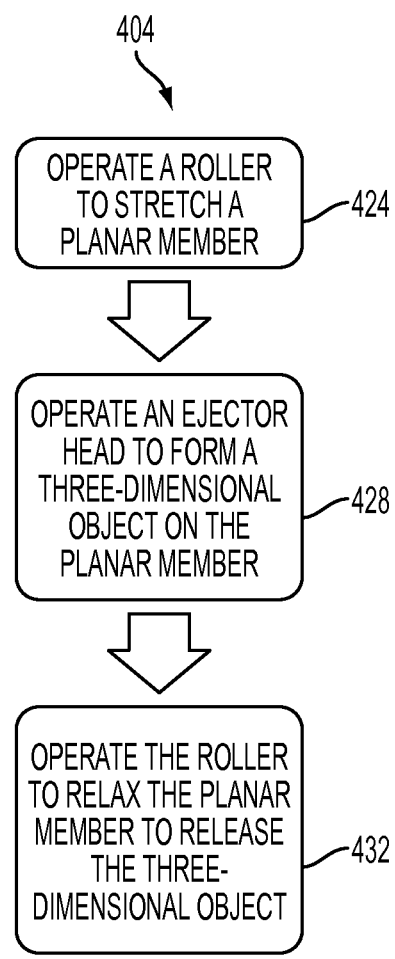

A method 404 for operating the printer 100 to automatically release printed parts from the platen 104 is shown in FIG. 4b. The method 404 is an embodiment of the method 200. When the method 404 is performed, it begins by operating a roller to stretch a planar member (block 424). The controller 120 operates at least one of the rollers 304 to horizontally stretch the planar member 112. Pre-stretching the planar member 112 changes a surface roughness is of the planar member 112 during a subsequent formation of a part. Next, the method 404 operates an ejector head to form a three-dimensional object on the planar member (block 428). The controller 120 operates the ejector head 108 to eject material onto the planar member 112 to form the part 116. Next, the method 404 operates the roller to relax the planar member to release the three-dimensional object (block 432). The controller 120 operates at least one of the rollers 304 to relax the planar member 112. The relaxing of the planar member 112 breaks any adhesion between the part 116 and the planar member 112 to release the part 116.

Figure 4C:
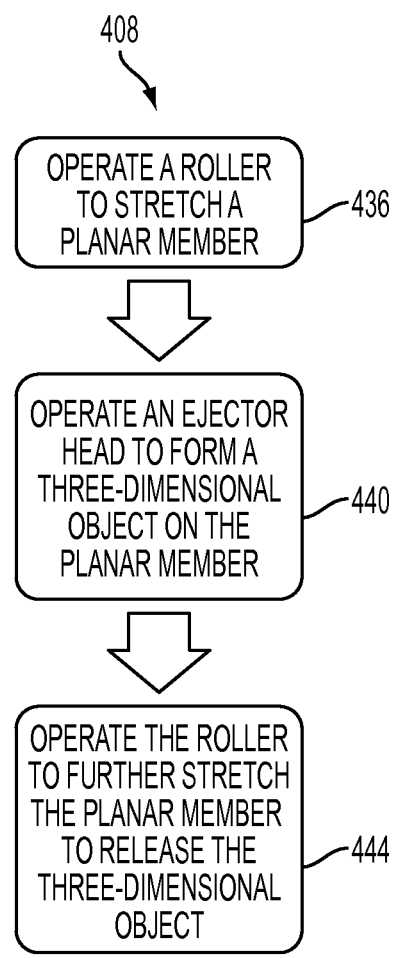

A method 408 for operating the printer 100 to automatically release printed parts from the platen 104 is shown in FIG. 4c. The method 408 is an embodiment of the method 200. When the method 408 is performed, it begins by operating a roller to stretch a planar member (block 436). The controller 120 operates at least one of the rollers 304 to horizontally stretch the planar member 112. Next, the method 408 operates an ejector head to form a three-dimensional object on the planar member (block 440). The controller 120 operates the ejector head 108 to eject material onto the planar member 112 to form the part 116. Next, the method 408 operates the roller to stretch the planar member further and release the three-dimensional object (block 444). The controller 120 operates at least one of the rollers 304 to stretch the planar member 112 further. The further stretching of the planar member 112 breaks any adhesion between the part 116 and the planar member 112 to release the part 116.

FIG. 5 shows a printer 500, which is another embodiment of the printer 100, wherein the actuator comprises an air pump configured to direct air to inflate the planar member 112. An air pump 504 is configured to direct air through openings 508 in an upper surface 512 of the platen 104. Passages 516 extend through the platen 104 to connect the openings 508 to the air pump 504. In one embodiment, the planar member 112 is attached to the perimeter of the upper surface 512 of the platen 104. In another embodiment, the planar member 112 is configured as a balloon that is configured to inflate via a connection to the openings 508. The controller 120 is configured to control the air pump 504 to direct air through the passages 516 and out the openings 508. In this way, air collects between the upper surface 512 and the planar member 112, causing the planar member 112 to inflate and stretch. Inflating the planar member 112 breaks any adhesion between the part 116 and the planar member 112. In this way, the printer 100 releases the part 116 from platen 104 in an automated way that does not risk damaging the part. This particular embodiment of the printer 100 is operated using the method 600.

Figure 6:
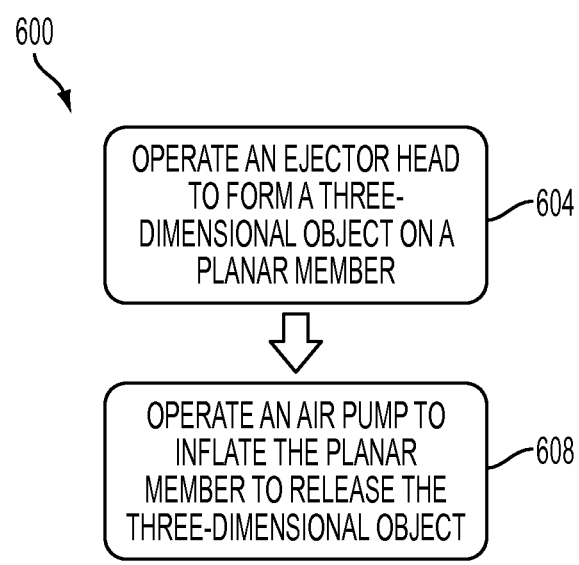
FIG. 6 shows an embodiment of the method of FIG. 2 for operating the printer of FIG. 5.

A method 600 for operating the printer 100 to automatically release printed parts from the platen 104 is shown in FIG. 6. The method 600 is an embodiment of the method 200. When the method 600 is performed, it begins by operating an ejector head to form a three-dimensional object on a planar member (block 604). The controller 120 operates the ejector head 108 to eject material onto the planar member 112 to form the part 116. Next, the method 600 operates an air pump to inflate the planar member to release the three-dimensional object (block 608). The controller 120 operates the air pump 504 to direct air through the passages 516 and out the openings 508, causing the planar member 112 to inflate. The inflating of the planar member 112 breaks any adhesion between the part 116 and the planar member 112 to release the part 116.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A printer for manufacturing a three-dimensional object comprising:
    a platen having a surface and at least one passage through the platen that terminates in an opening at the surface of the platen;
    a balloon attached to the platen along a perimeter of the platen to enclose a volume between the balloon and the platen and the balloon being in fluid communication with the opening at the surface of the platen;
    an actuator in fluid communication with the at least one passage through the platen, the actuator being configured to move air through the passage and into the volume between the platen and the balloon to stretch the balloon and deform the balloon;

an ejector head having a plurality of ejectors configured to eject drops of material towards the balloon on the platen; and a controller operatively connected to the actuator and the ejector head, the controller being configured to:

operate the plurality of ejectors in the ejector head to eject the drops of material towards the balloon on the platen and form layers of material with reference to digital image data of a three-dimensional object to produce the three-dimensional object on the balloon while the balloon is attached to the perimeter of the platen; and operate the actuator to move air through the at least one passage through the platen and into the volume between the balloon and the platen to stretch and deform the balloon while the balloon is attached to the perimeter of the platen to release the three-dimensional object from the balloon attached to perimeter of the platen.

2. The printer of claim 1, the controller being further configured to:

operate ejectors in the plurality of ejectors in the ejector head to form a base consisting essentially of wax on the balloon on the platen before operating the plurality of ejectors in the ejector head to eject drops of material towards the balloon on the platen to form the three-dimensional object.

3. The printer of claim 1, the controller being further configured to:

operate the actuator to relax the balloon attached to the perimeter of the platen with respect to the platen before operating the ejector head to eject material onto the balloon attached to the perimeter of the platen to form the three-dimensional object; and operate the actuator to direct air into the volume between the balloon and the platen to stretch and deform the balloon attached to the perimeter of the platen to release the three-dimensional object from the balloon attached to the perimeter of the platen after operating the plurality of ejectors in the ejector head to eject drops of material towards the balloon attached to the perimeter of the platen to form the three-dimensional object.

4. The printer of claim 1, the controller being further configured to:

operate the actuator to direct air into the volume between the balloon and the platen to stretch and deform the balloon attached to the perimeter of the platen before operating the plurality of ejectors in the ejector head to eject drops of material towards the balloon to form the three-dimensional object on the balloon attached to the perimeter of the platen; and operate the actuator to relax the balloon attached to the perimeter of the platen and release the three-dimensional object from the balloon attached to the perimeter of the platen after operating the plurality of ejectors in the ejector head to eject drops of material towards the balloon attached to the perimeter of the platen to form the three-dimensional object on the balloon attached to the perimeter of the platen.

* * * * *